Figure 1:
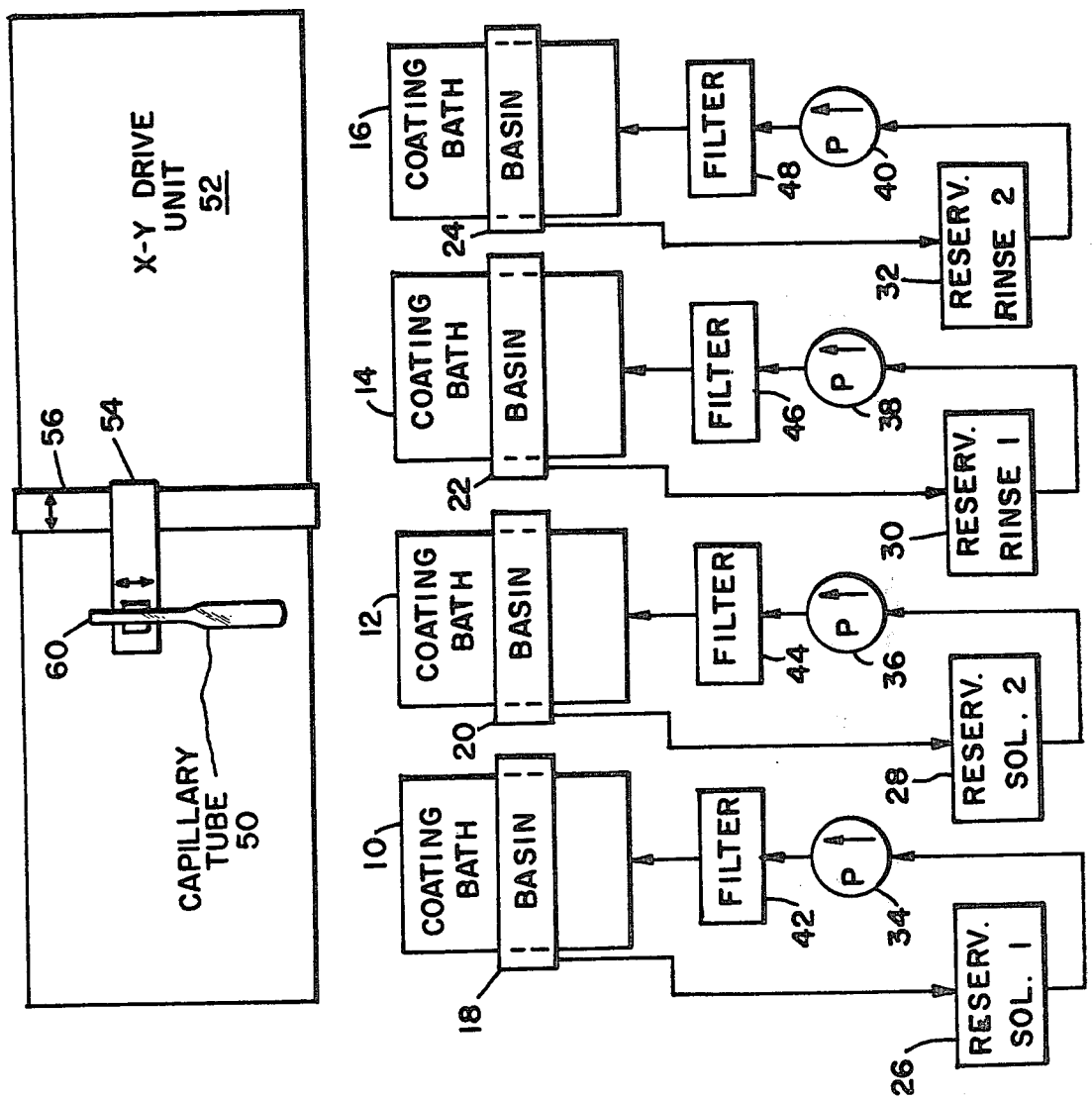

United States Patent [19]

Peiffer et al.

[11] 4,404,255
[45] Sep. 13, 1983

[54] COLLOIDAL COATING FOR SMALL THREE DIMENSIONAL ARTICLES, AND PARTICULARLY FOR FUSION TARGETS HAVING GLASS SHELLS

[75] Inventors: Dennis G. Peiffer, East Brunswick; Harry W. Deckman, Fanwood, both of N.J.

[73] Assignee: The University of Rochester, Rochester, N.Y.

[21] Appl. No.: 255,622

[22] Filed: Apr. 20, 1981

Related U.S. Application Data

[62] Division of Ser. No. 155,266, Jun. 2, 1980, Pat. No. 4,315,958.

[51] Int. Cl.$^3$ ............................................... B32B 5/16
[52] U.S. Cl. ..................................... 428/406; 65/60.2; 65/60.3; 65/60.5; 65/60.8; 252/315.5; 427/214; 427/215; 428/432; 376/151
[58] Field of Search ....................... 65/21.3, 21.4, 60 A, 65/60 D, 60.2, 60.3, 60.5, 60.8; 176/1; 427/214, 215; 428/406, 432, 403; 252/317

[56] References Cited

U.S. PATENT DOCUMENTS

| | | | |
|---|---|---|---|
| 3,485,658 | 12/1969 | Iler | 427/379 X |
| 4,290,847 | 9/1981 | Johnson et al. | 428/403 X |
| 4,302,311 | 11/1981 | Lowe et al. | 428/406 X |

*Primary Examiner*—Edward C. Kimlin
*Assistant Examiner*—Robert A. Dawson
*Attorney, Agent, or Firm*—Martin Lukacher

[57] ABSTRACT

Extremely small, three-dimensional articles, such as fusion targets having glass shells (20 to 500 microns in diameter) are coated with alternate layers of colloidal materials. This is accomplished by depositing particles of opposite charge from colloidal suspensions (sols). Articles to be coated are suspended within a drop held in the open end of a closed capillary tube, and colloidal particles are deposited by dipping the capillary into the sols. Alternate monolayers of the particles adhere to the surface of the article. Multilayer coatings are built up by repeated alternate deposition of the monolayers from the sols. Between each deposition, the layers are rinsed with water and the water removed by dipping the capillary tube into a bath of water and then into a bath containing a water displacing agent such as ethanol or dimethyl sulfoxide.

5 Claims, 4 Drawing Figures

COLLOIDAL COATING FOR SMALL THREE DIMENSIONAL ARTICLES, AND PARTICULARLY FOR FUSION TARGETS HAVING GLASS SHELLS

This is a continuation, division, of application Ser. No. 06/155,266 filed June 2, 1980, now U.S. Pat. No. 4,315,958.

DESCRIPTION

The present invention relates to three dimensional articles of very small size having uniform coatings generated by adhering alternate layers of negatively and positively charged colloidal particles and to methods of providing such coatings.

The invention is especially suitable for use in fabricating targets for inertial confinement fusion where targets are imploded by high energy beams, for example laser beams. Such targets have glass shells usually in the form of tiny, hollow glass spheres, called microspheres or microballoons. The term "glass" is intended to encompass the entire class of materials which are siliceous in chemical nature. The glass surface of said microballoons is normally negatively charged forming an anionic polar surface. Thus the substrate to be coated provides a charged surface for deposition of alternate monolayers of positively and negatively charged colloidal particles for forming a uniform and coherent film. The invention is also applicable for providing coatings on other small three dimensional articles having surfaces which are capable of attracting a monolayer of collodial particles. For example, carboxylated or sulfonated polymeric beads could be coated with these techniques.

Microballoons for fusion target applications are fabricated from glass with uniform walls. It is requisite that the uniformity be maintained in any coating or film around the microballoon, which can provide tampers or pushers to promote or enhance the fusion reaction when the targets are used in fusion apparatus, as when laser beams of extremely high energy are made incident thereon. In addition to the absence of surface deviation in the coating on the microballoon, the thickness of the coating must be maintained precisely. Thicknesses desired are of the order of microns and are desirably maintained within a one-half micron tolerance or deviation. Preferably, the deviation is less than one-tenth micron.

Various methods have been used for the fabrication of the microballoons themselves. A discussion of the materials used and the methods for making the microballoons is found in the disclosure of U.S. Pat. No. 4,133,854 issued Jan. 9, 1979. Coatings for microballoons have involved the use of pyrolyzing polymer materials, spraying or sputtering and vapor deposition. Precision coatings of precise thickness and without significant surface deviation have been difficult to produce.

Techniques have been suggested for coating colloidal particles onto substrates having polar surfaces, such as glass. The substrates which have been coated using these techniques have been very large as compared to the dimension of microballoons (e.g., maximum size from 20 to 500 microns). Present techniques for producing colloidal coatings consist of dipping substrates into colloidal suspensions followed by rinsing and drying steps. These techniques have been described by Iler in U.S. Pat. No. 3,485,658 as well as in Iler, Journal of Colloid and Interface Science 21, 569–594 (1966); Iler, Journal of the American Ceramic Society 47 (4), 194–198 (1964); and Marshall and Kitchener, Journal of Colloid and Interface Science 22, 342–351 (1966). Molecular size layers can be applied by the Langmuir-Blodgett technique (see Gains, *Insoluble Monolayers at Liquid Gas Interfaces*, Interscience, § 336–345 (1966). Other techniques have been described for providing molecular coatings on polar surfaces (see the disclosures of U.S. Pat. Nos. 2,482,054, issued Sept. 13, 1949; 3,510,343 issued May 5, 1970; 3,868,266 issued Feb. 25, 1975; and 3,993,835 issued Nov. 23, 1976). Multilayer coatings of precise thickness and minimal surface deviation on microscopically small three dimensional articles, such as microballoons have, however, not been achieved.

It is an object of the present invention to provide improved small three dimensional articles which have uniform coatings of colloidal particles thereon, as well as to provide methods of producing such coatings.

It is a further object of the invention to provide improved methods for coating a very small substrate surface to form a multi-layered coating thereon of precise thickness and uniformity.

It is a still further object of the invention to provide improved coatings and coating methods, for small three dimensional articles which have surfaces possessing an inherent charge, and coatings are made up of monolayers of particles which adhere to the surface of the article and to each other by electrostatic forces.

It is a still further object of the present invention to provide improved articles of microscopic size (e.g. 20 to 500 microns), such as microballoons which are useful in fabricating fusion targets, having coatings thereon of precise thickness and minimal surface deviation.

It is a still further object of the present invention to provide an improved fusion target having a multi-layered coating thereon suitable for providing a tamper or pusher, and to methods for producing such a target.

In accordance with the invention, coatings consisting of monolayers of colloidal particles are formed on the surface of a small article, such as glass microballoon(s), by suspending the microballoon(s) in liquid. The microballoon(s) may be loaded into water contained within the open end of a closed capillary tube. The colloidal particles are diffused into the liquid in the capillary from coating baths containing dilute (typically less than 0.5 wt%) suspensions thereof. Colloidal particles are electrostatically attracted to the oppositely charged surface of the microballoon(s). In order to make a monolayer of the colloidal particles strongly adherent onto the previously deposited layer, the layers are rinsed with water and the water in the layer is displaced after each of the rinsing steps. This is accomplished by contacting the tube containing the microballoons with a water bath and subsequently with a bath of a water displacing agent such an ethanol or, and more preferably, dimethyl sulfoxide (DMSO). The positively charged colloidal particles may be a metal oxide, for example alumina, $Al_2O_3$. The negatively charged particles may be silica $SiO_2$ or organic polymers, preferably organic polymer latices of styrene, acrylates or butadiene. The particle sizes may be from 50 Angstroms to 50 microns in maximum dimension. The metal oxide and silica particles can range from 50 to greater than 300 Angstroms. The diffussing steps or dippings into the colloidal particle baths, with intervening rinsing and water displacing steps, are then repeated a multiplicity of times until a film of predetermined thickness is obtained. For example approximately 100 dippings will provide a film one micron in thickness of alternating layers of $Al_2O_3$ and $SiO_2$ particles. Organic polymer particles may be from 0.05 to 10 microns. Alternate layers of organic polymer and metal oxide particles are also used. Then fewer layers are needed to obtain films of the same thickness as those obtained with inorganic materials, such as the smaller metal oxide and silica particles.

A serious problem of cracking in thick multilayer films (thickness>0.1 mm) may be alleviated, in accordance with the invention, through the use of a plasticizer which prevents cracking without interference with the formation of multiple layers. This plasticizer may be contained in a small amount (typically less than 0.01 wt%) in the bath of water displacing agent (e.g. the ethanol or DMSO bath).

In accordance with a feature of the invention, minimal surface deviation and smooth coherent films are obtainable through use of colloidal particles of small size. In accordance with another feature of the invention, minimal surface deviation and smooth coherent films are also obtained even when larger size organic latices are used providing they are comprised of uniformly sized spherical polymer particles of material having a glass transition temperature near or below room temperature. Such organic polymer latex polymer particles coalesce and form a smooth uniform coherent film. Previously a technique to produce films using organic colloidal particles with glass transition temperatures well below room temperature has been described by Pieffer and Nielsen, J. Appl. Polym. Sci 23,2253 (1979) and by Pieffer, J. Appl. Polym. Sci. 24,1451 (1979). However, this work did not use uniformly sized spherical polymer particles to produce films with minimum surface deviation. By using uniformly sized spherical latices, the deposited colloidal particles arrange into a close packed uniform array before the film is coalesced. Upon coalescence of the close packed uniform array of particles, a uniform film with minimal surface deviation is formed. Spherical acrylate particles having a molecular weight of above 2,000 g/mole provide a glass transition temperature of approximately $-18°$ centigrade and may be used to form the monolayers of negatively charged particles which coalesce to provide the smooth coherent film. In order to obtain a uniform film with 2,000 A sized acrylate spheres, the particle size must not vary by more than approximately 25%. Where such low glass transition temperature organic polymer particles are used, it is not necessary to add plasticizers to the water displacing agent bath.

The foregoing other objects, features and advantages of the invention as well as the best modes now known for practicing the invention will become more apparent from a reading of the following description in connection with the accompanying drawings in which:

FIG. 1 is a schematic diagram of apparatus in accordance with the invention for producing coatings of monolayers of colloidal particles on microballoons; and FIGS. 2(a), (b) and (c) are enlarged sectional views of a capillary tube which is used in the apparatus shown in FIG. 1 and showing the steps whereby microballoons are loaded and suspended in liquid at the open end of the tube.

In carrying out the invention, films which may for example be up to 5 microns thick may be produced on glass microballoons 20 to 500 microns in diameter. The glass compositions of such microballoons may be as described in the above reference U.S. Pat. No. 4,133,854. The invention is applicable for the coating of many articles which have surfaces presenting an inherent charge. Various glass materials provide such a charge as disclosed in above referenced U.S. Pat. No. 3,485,658. Although the invention is particularly useful in providing coatings on glass microballoons, it may be used wherever small three dimensional articles require uniform coatings on their surfaces.

The coatings are generated by adhering alternate layers of negatively and positively charged colloidal particles to form a uniform and coherent film on the article (which may be a microballoon). Multiple layers of these particles are deposited from dilute colloidal suspension (sols) utilizing the attraction of oppositely charged particles to the coating surface. Each sol contains one type of colloidal particle and only a monolayer of the particles is adhered to the coating surface because further deposition is inhibited by electrostatic repulsion. In the case of the glass microballoon the initial coating layer is of positively charged colloidal particles, because the glass surface is normally anionic and, as such, will attract the positively charged colloidal particles. Positively charged particles may be metal oxides such as aluminum oxide ($Al_2O_3$) or chromium oxide ($Cr_2O_3$) contained in aqueous solution with pH adjusted to be less than 4.0. Such oxides ar obtainable in uniform size particles (monodispersed). In order to provide coatings for glass microspheres, it is presently preferred to use alumina particles. Such particles are obtained in uniform platelets or fibrils from 50 to 150 Angstroms in maximum dimension. The material is known commercially as Baymal alumina and is obtained from the E. I. Dupont Company of Wilmington, Delaware. Negatively charged particles may be colloidal silica (glass), $SiO_2$. The material is known commercially as Ludox and is obtained from the E. I. Dupont Company of Wilmington, Delaware. Multiple layers of alumina and silica particles are deposited to build up the thickness of the film on the microballoon to a predetermined desired thickness. The silica particles may also be from about 50 to 150 Angstroms such that the film surface deviation is very small.

In order for a tamper or pusher layer to be provided, a low Z (atomic number) material is desired. To this end the negatively charged particles may be organic polymer particles, preferably polymer latex particles. These particles are round and monodispersed. They may be made by emulsion polymerization techniques known in the art. The diameter of the polymer latex particles may be precisely controlled by the addition of initiator and inhibitor compounds to control the growth thereof (e.g., benzoyl peroxide as an initiator and acetic acid as an inhibitor in the case of polystyrene latex particles). Other latex particles may be used, for example, acrylate and butadiene and other rubber-like materials.

Whenever the diameter of the particles is large (e.g., greater than 0.1 micron), it is desirable to use spherical uniform sized polymer particles having a low glass transition temperature. Acrylates are presently preferred. A suitable acrylate may be ethyl methacrylate/ethylene copolymer having a molecular weight of greater than 2,000 g/mole. Preferably the acrylate particles are spherical with diameters which do not vary by more than 25% about the mean. Other low glass transition temperature polymers may be used, specifically polybutadiene, having a molecular weight of greater than 1,000 g/mole, polyisoprene, having a molecular weight of greater than 1,000 g/mole. Also, these particles should be spherical and monodisperse. By low glass transition temperature is meant a glass transition temperature near or below room temperature (25° centigrade). To produce a uniform film the polymer particles must be spherical and monodisperse in size, specifically diameters should not vary by more than 25% about the mean.

Dilute colloidal suspensions (sols) of the particles are prepared. These may contain the particles approximately 0.25 weight percent in the sol. Preferably deionized water is used throughout. It is also preferable that the sols have an excess of hydrogen ions. This may be obtained by adjusting the pH of the sols to be about 3, by addition of HCl acid dropwise to the dilute sols.

The glass surfaces of the microballoons are cleaned by glass cleaning techniques known in the art. For example the cleaning procedure may be as follows. The balloons are first washed with a commercial surfactant and then rinsed with deionized water. After rinsing they are degreased with trichloroethylene and washed in ethanol, followed by a final water rinse.

In the event that the microballoons have stalks attached, which are desirably not coated, the stalks may be conditioned so as not to accept the colloidal particle coating. This may be accomplished by washing the stalks with chromic-sulphuric acid. Then the stalks are passivated with hydrochloric acid and washed in water. This prevents particles from depositing on the stalks. Any area of the microballoon surface which is not to have a coating thereon may similarly be treated. Alternatively a hydrophobic material such as wax may be deposited on the stalk to prevent coating.

Referring to FIG. 1 the sols are arranged in coating baths 10 and 12. Bath 10 contains the negatively charged particles in aqueous solution; for example, the sol of silica particles or of organic polymer latex particles. The other coating bath 12 contains the metal oxide particles in aqueous solution; for example, a sol of Baymal alumina particles. Additional baths may be provided where monolayers of different particles are to be coated on the microballoon.

Two other baths 14 and 16 are also provided, namely a rinse bath 14 of deionized water and another rinse bath 16 of a water removing agent. Preferably the pH of baths 14 and 16 is also adjusted to 3.0. The water removing agent may be ethanol. However dimethyl sulfoxide (DMSO) is preferably used. The DMSO has a density [approximately 1.1 g/cc (at 25° C.)] closer to water than does ethanol [approximately 0.78 g/cc at 25° C.] and permits more rapid diffusion and removal of the water from the coating on the microballoon than does the lighter ethanol.

Each of the baths, 10, 12, 14 and 16 has a basin 18, 20, 22, and 24 surrounding it for catching the overflow from the baths. The overflow from each basin 18, 20, 22 and 24 is into its own reservoir 26, 28, 30 and 32. Liquid from the reservoirs is pumped by pumps 34, 36, 38 and 40 through filters 42, 44, 46 and 48 into the bottom of the baths 10, 12, 14 and 16. The pumps are preferably reciprocating pumps of material which does not interact with the sols and agents in the baths, for instance teflon. The filters are provided to remove gel particles formed in the dilute sols as well as dust and other particulates. These may be membrane filters, for example of polycarbonate material. When DMSO is used in the water displacement bath 16, the filter is omitted, the filters may be one micron filters when used in conjunction with the silica and alumina baths, 10 and 12, respectively. In order to filter the water and the water removing agent, the filters 46 and 48 may for example be 0.4 micron filters. The pumps operate slowly so as to minimize the turbulence in the baths and yet provide continuous mixing. It may be desired, particularly in the bath 16, when DMSO is contained therein, to stir the bath gently. Suitably the rate of flow around the pumping and filtering system may be approximately 1–10 cc per minute. The rate of flow and also the velocity with which the microballoons are immersed into the baths is adjusted to prevent shearing of the layers as they deposit on the microballoon surfaces.

The microballoons are suspended in a capillary tube 50 which is moved horizontally between the baths and vertically into and out of the baths by an X-Y drive unit 52 which may be part of a conventional chart recorder. This unit has a beam 54 which moves vertically on another beam 56 which moves horizontally. The movement of the beams is controlled by motors which are in turn controlled by a programmed digital control unit. The unit is programmed so that the capillary tube is initially dipped into the positively charged particle bath 12 preferably for approximately 40 sec. Then the tube is moved to the right and dipped into the water rinse bath 14 preferably for approximately 100 sec. Following the water rinse, the tube 50 is dipped into the water removal agent rinse bath 16 preferably for approximately 40 sec. A monolayer of positively charged particles is thereby applied to and coats the surface of the microballoon. The capillary tube is then moved to the left and dipped into the positively charged sol in the bath 10 and preferably held there for approximately 40 sec. Following this dipping the tube is dipped into the rinse baths 14 and 16. A pair of monolayers has now been deposited on the microballoon. The sequence of dippings can be repeated a predetermined number of times, and a predetermined number of monolayers deposited. The precise thickness of the coatings is obtained by selecting the number of layers to be deposited. The drive unit may be programmed to provide, for example, 100 sequences. In the case where alumina and silica particles have about 100 Angstrom units in maximum dimension are used, approximately 100 sequences produces a film one micron is thickness.

Figure 2:
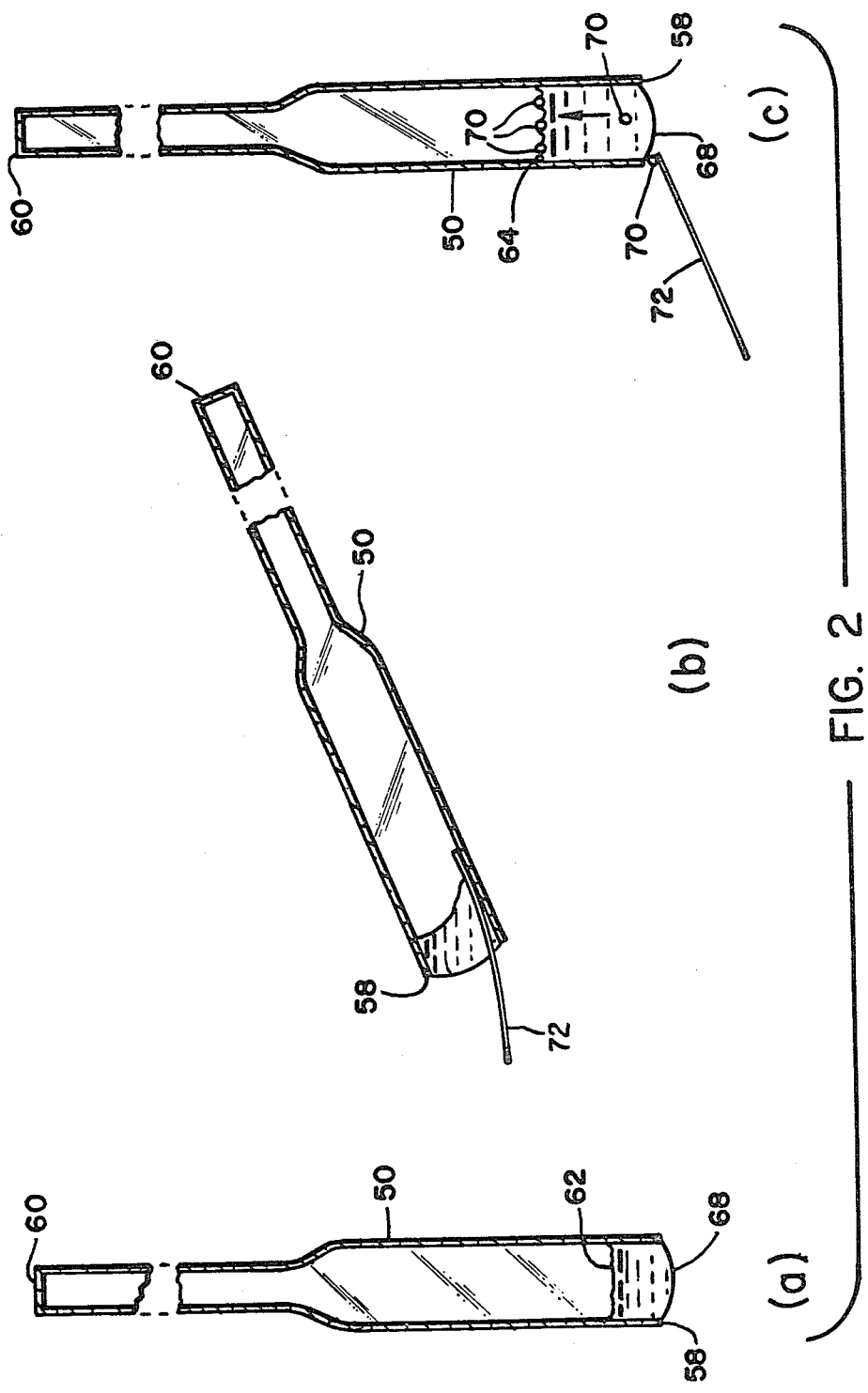

The microballoons are suspended in liquid (water) in the open end of the capillary tube 50 by means of the loading procedure shown in FIG. 2. The open end 54 of the capillary tube 50 which is closed at its opposite end 60 (FIG. 1) is dipped into water and the water rises due to capillary action to a first level 62 as shown in FIG. 2(a). The tube is then tilted to its side and the walls thereof (above the first level 62), are wetted with a filament or hair 64 which is used to bring the water in the tube up along the sides thereof. The tube is then dipped again in water and the water rises to a second level 64 further from the open end (58) of the tube than the first level 62.

The microballoons 70 are then loaded into the water by contacting them with the miniscus 68 which is formed by the water at the open end 58 of the tube 50. The microballoon 70 may be carried by a filament or hair 72 and contacted with the miniscus 68. The balloons rise to the top of the body of water (i.e. to the level 64). The microballoons congregate at the level 64. Many microballoons, for example about 40, may be loaded in a capillary tube having an outside diameter of one millimeter. All of the microballoons are coated at the same time. In the deposition of the particles and in the rinsing thereof, the dipping of the open end of the capillary tube 50 into the baths enables the particles to diffuse through the water in the open end of the capillary tube 50 to the surfaces of the microballoons. The water removing agent (ethanol or DMSO) from the rinse bath 16 also diffuses to the microballoon surfaces and removes the water thereon. Because the microballoons are held at a higher level above the open end of the tube than the level normally obtained through capillary action, the microballoons do not fall out of the tube into the baths.

All of the coating steps are carried out in liquid. This enables small three dimensional articles such as microballoons to be coated on all of their surfaces. It is an important feature of the invention to provide for the coating of such small articles which could otherwise not be readily handled and coated with colloidal particles. Not only is the coating with the positively charged particles accomplished, but also a rinsing of the layers which constitutes the coating, including the removal of water, all in a uniform manner which could not readily be accomplished by air drying. After coating is completed, the microballoons may be removed with the liquid from the open end of the tube onto a sheet, for example in a nitrogen or other inert atmosphere and then transferred into a bottle and stored until ready for use in the fusion apparatus. The microballoons are preferably filled with fusion fuel (deuterium or deuterium tritium gas) prior to being coated.

Coatings (films), particularly when made up of a large number of layers have been found to have the tendency to crack and rupture randomly. Such cracking and rupturing is obviated in accordance with the invention through the use of an organic material which does not interfere with the formation of multiple layers. This material is preferably a plasticizer which is added in a small amount, which is not critical, to the water removing agent bath 16. The plasticizer is preferably di-n-octyl phthalate (DOP). It is dispersed in the bath and is preferably provided in less than 0.01 weight percent, although this amount is not critical. Sufficient amount of the plasticizer is added such that the cracking and rupturing is eliminated. Other materials which may be used as the plasticizer are diethyl phthalate, diisobutyl phthalate, and dimethyl isophthalate.

In the event that the bath 10 contains a latex polymer colloidal sol where the latex polymer has low glass transition temperature, the particles coalesce and form a uniform smooth coherent film without the need for the plasticizer. The presence of a plasticizer in the water removing agent bath, even where the low glass transition temperature polymer particles are used, does not adversely affect the coating.

From the foregoing description it will be apparent that there has been provided improved coated articles and improved methods of producing coatings of precise thickness having minimal surface deviations thereon. The invention has been described as particularly applicable to the fabrication of microballoons used as inertial fusion targets. Variations and modifications of the herein described articles and methods on other utilities therefor will undoubtedly suggest themselves to those skilled in the art. Accordingly the foregoing description should be taken as illustrative and not in a limiting sense.

We claim:

1. A three-dimensional glass microballoon of maximum dimensions from about 20 to 500 microns coated on all surfaces thereof and of material having an inherent surface charge of one polarity, a multitude of alternate monolayers of particles of material of positive and negative opposite charge adhered to said surfaces onto each other, the first of said monolayers being particles of polarity opposite to said one polarity.

2. The invention as set forth in claim 1 wherein said article is a closed shell.

3. The invention as set forth in claim 2 wherein alternate ones of said monolayers are of different inorganic material with an organic material between said particles.

4. The invention as set forth in claim 3 wherein said inorganic materials of said positively charged particles are selected from $Al_2O_3$ and $Cr_2O_3$, and said material of said negatively charged particles is $SiO_2$, said organic material is selected from the group consisting of acrylates, styrenics, and butadienes.

5. The invention as set forth in claim 2 wherein said positively charged particles are metal oxide particles of maximum dimensions from 50 to 150 Angstroms and said negatively charged particles are organic polymer latex particles of maximum dimension from about 0.05 to 5 microns.

* * * * *